United States Patent Office 3,091,640
Patented May 28, 1963

3,091,640
1 - (4 - METHOXYPHENYL) - 1 - DIMETHYLAMINO-2 - PHENYL ETHANE, ACID ADDITION SALTS AND QUATERNARY AMMONIUM SALTS
Ernst Seeger and August Kottler, Biberach an der Riss, Germany, assignors to Dr. Karl Thomae, G.m.b.H., Biberach an der Riss, Germany, a corporation of Germany
No Drawing. Filed Feb. 4, 1960, Ser. No. 6,618
3 Claims. (Cl. 260—570.8)

This is a continuation-in-part of copending application Serial No. 710,186, filed January 21, 1958, which in turn is a continuation-in-part of application Serial No. 630,454, filed December 26, 1956, now abandoned, which in turn is a continuation-in-part of application Serial No. 555,785, filed December 28, 1955, now abandoned.

This invention relates to novel tertiary amines having useful pharmacological properties and to their nontoxic acid addition salts and quaternary compounds.

More particularly, the present invention relates to tertiary amines having a structural formula selected from the group consisting of

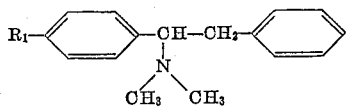

(I)

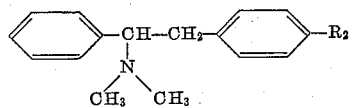

(II)

and

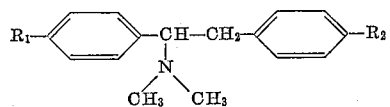

(III)

wherein $R_1$ and $R_2$ are selected from the group consisting of methyl, isopropyl, hydroxy and methoxy, their pharmacologically useful non-toxic acid addition salts and their quaternary ammonium salts with pharmacologically useful quaternizing radicals and ions.

The tertiary amines having structural Formula I above may be prepared by reacting α-dimethylamino-acetonitriles having the structural formula

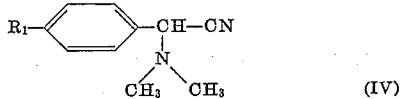

(IV)

wherein $R_1$ has the same meaning as defined above, with an organic magnesium halide having the structural formula $$Hal-Mg-CH_2-\phantom{xxx}$$

(V)

wherein Hal is a halogen with an atomic weight from 35 to 127, inclusive, i.e. chlorine, bromine or iodine.

Similarly, tertiary amines having the structural Formula II above may be prepared by reacting α-phenyl-α-dimethylamino-acetonitrile of the formula

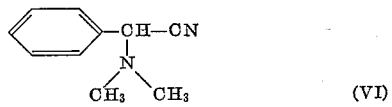

(VI)

with an organic magnesium halide of the formula

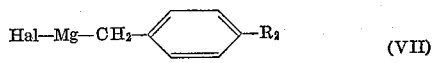

(VII)

wherein Hal and $R_2$ have the meanings defined above in connection with Formulas V and II, respectively.

Analogously, tertiary amines of the Formula III may be prepared by reacting α-dimethylamino-acetonitriles of the Formula IV with an organic magnesium halide of the Formula VII.

Another convenient method of preparing tertiary amines of the Formula I according to the present invention comprises reacting an aldehyde of the formula

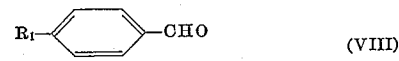

(VIII)

wherein $R_1$ has the meaning defined above, with methylamine to form the corresponding Schiff's base of the formula

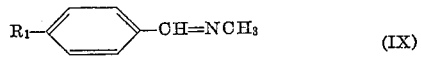

(IX)

reacting the Schiff's base with an organic magnesium halide of the Formula V to form a secondary amine of the formula

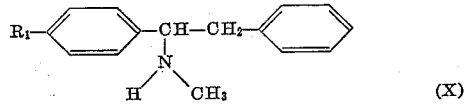

(X)

and N-methylating the secondary amine with a suitable methylating agent, such as a mixture of acetic acid and formaldehyde.

Tertiary amines having the structural Formulas II and III may, of course, be prepared in analogous fashion.

Still another method of preparing the tertiary amines according to the present invention comprises subjecting a primary amino compound of the formula

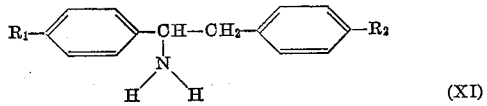

(XI)

to an alkylating reaction with a suitable methylating agent such as a mixture of acetic acid and formaldehyde, to form the corresponding dimethyl tertiary amine of the Formula III, wherein $R_1$ and $R_2$ have the meanings previously defined. Similarly compounds of the Formulas I and II may be obtained by the same method, starting with primary amines of the Formula XI wherein $R_1$ or $R_2$, but not both simultaneously, are hydrogen.

Finally, the tertiary amines of the present invention may also be prepared by still another process, which comprises reacting an aldehyde of the Formula VIII with dimethylamine and n-butanol to produce an ether of the formula

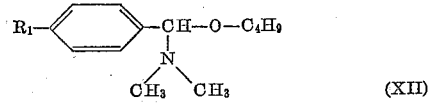

(XII)

and then reacting the ether with a Grignard reagent of the Formula VII to form a tertiary amine of the Formula III, $R_1$ and $R_2$ having the same meaning as previously defined. Of course, tertiary amines of the Formulas I and II can be prepared in analogous fashion.

The following examples will illustrate the preparation of various representative compounds of the group defined by Formulas I, II and III above and will enable others skilled in the art to understand the present invention more completely. It will be understood, however, that the invention is not limited to the particular compounds illustrated in these examples.

EXAMPLE 1

*1-(4-Methoxy-Phenyl)-1-Dimethylamino-2-Phenyl-Ethane*

19 gm. (4-methoxy-phenyl)-dimethylamino-acetonitrile (boiling point: 108–110° C. at 0.35 mm. Hg) were dissolved in 50 cc. ether. The resulting solution was slowly added, accompanied by stirring, to a Grignard solution which had been prepared in the usual manner by adding a solution of 25.2 gm. benzyl chloride in 50 cc. ether dropwise to 4.6 gm. magnesium shavings in 40 cc. anhydrous ether, accompanied by stirring. The reaction mixture was refluxed at the boiling point for 2 hours and was then decomposed by adding ice and dilute hydrochloric acid in an amount sufficient to make it acidic. The ether layer was separated and discarded. A small amount of ammonium chloride and thereafter ammonia were added to the aqueous phase until it reacted alkaline. The precipitate formed was separated and dissolved in ether. The ether was removed by distillation and the residue was distilled in a vacuum. A compound having the structural formula

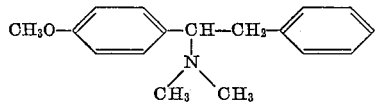

and a boiling point of 142–143° C. at 0.5 mm. Hg was obtained. The yield was 79% of theory.

The same result was obtained when benzene was used as a solvent in place of ether.

To convert the tertiary amine into its hydrochloride addition salt it was dissolved in ether and precipitated from solution by adding ethereal hydrochloric acid. The hydrochloride was obtained in the form of colorless crystals having a melting point of 187° C.

EXAMPLE 2

*1-(4-Methyl-Phenyl)-1-Dimethylamino-2-Phenyl-Ethane*

8.7 gm. (4-methyl-phenyl)-dimethylamino-acetonitrile, having a boiling point of 104° C. at 0.7 mm. Hg were reacted with a Grignard compound, prepared from 12.6 gm. benzyl chloride and 2.3 gm. magnesium in ether, and the reaction mixture was worked up as described in Example 1. A compound having the structural formula

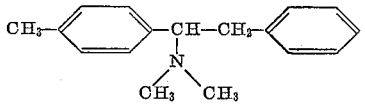

and a boiling point of 130° C. at 0.5 mm. Hg was obtained. The yield was 74% of theory.

When dibutyl ether was used as the solvent medium in place of ether and the reaction mixture was heated to 90–100° C. instead of refluxed, the yield was 71% of theory.

The colorless hydrochloride of the above tertiary amine was obtained in the same manner as described in Example 1. Its melting point was 189° C.

EXAMPLE 3

*1-(4-Hydroxy-Phenyl)-1-Dimethylamino-2-Phenyl-Ethane*

A Grignard reagent, prepared from 12.6 gm. benzyl chloride and 2.3 gm. magnesium, was reacted in ether with 5.9 gm. (4-hydroxy-phenyl)-dimethylamino-acetonitrile having a melting point of 75° C. and the reaction mixture was worked up as described in Example 2. After evaporating the ether, a compound having the structural formula

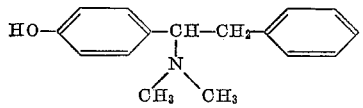

was obtained. The raw product was not purified by distillation but was recrystallized from ethanol. The recrystallized product was obtained in the form of colorless crystals having a melting point of 136–138° C. The yield was 59% of theory. On analysis the nitrogen content of this compound was found to be 5.83% (calculated: 5.81%).

The hydrochloride of this amine was prepared as described in Example 1; it had a melting point of 173° C.

EXAMPLE 4

*1-(4-Isopropyl-Phenyl)-1-Dimethylamino-2-Phenyl-Ethane*

A Grignard reagent, prepared from 4.6 gm. magnesium and 25.2 gm. benzyl chloride, was reacted in ether with 20.2 gm. (4-isopropyl-phenyl)-dimethylamino-acetonitrile having a boiling point of 96° C. at 0.2 mm. Hg, as decribed in Example 1. A compound having the structural formula

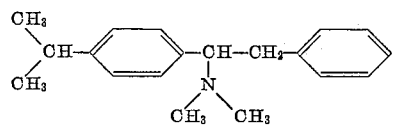

was obtained as a yellowish liquid having a boiling point of 93–96° C. at 0.07 mm. Hg. On analysis its nitrogen content was found to be 5.24% (calculated: 5.24%). The yield was 61% of theory.

EXAMPLE 5

*1-(4-Methoxy-Phenyl)-1-Dimethylamino-2-(4-Methyl-Phenyl)-Ethane*

19 gm. (4-methoxy-phenyl)-dimethylamino-acetonitrile were reacted in ether with a Grignard reagent, prepared from 37 gm. p-xylyl bromide and 4.6 gm. magnesium shavings, and the reaction mixture was worked up as described in Example I. A compound having the structural formula.

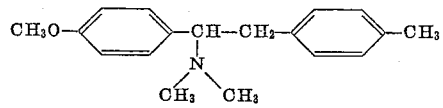

was obtained as a colorless liquid having a boiling point of 132° C. at 0.25 mm. Hg. The yield was 67% of theory. The reaction product solidified on standing at room temperature. The solid product had a melting point of about 45° C. On analysis, its nitrogen content was found to be 5.35% (calculated: 5.2%).

EXAMPLE 6

*1-(4-Hydroxy-Phenyl)-1-Dimethylamino-2-(4-Methyl-Phenyl)-Ethane*

A Grignard reagent, prepared from 2.3 gm. magnesium and 18.5 gm. p-xylyl bromide, was reacted in ether with 5.9 gm. (4-hydroxy-phenyl)-dimethylamino-acetonitrile and the reaction mixture was worked up as described in Example 3. A compound having the structural formula

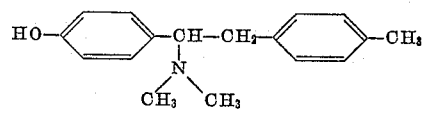

was obtained, which was recrystallized from ethanol. The purified product melted at 141° C. (decomposition). The yield was 62% of theory. On analysis its nitrogen content was found to be 5.54% (calculated: 5.49%).

The hydrochloride of this compound melted at 188° C.

EXAMPLE 7

*1,2-Bis-(4-Methyl-Phenyl)-1-Dimethylamino-Ethane*

17.4 gm. (4-methyl-phenyl)-dimethylamino-acetonitrile were reacted in ether with a Grignard reagent, prepared from 4.6 gm. magnesium and 37 gm. p-xylyl bromide, and the reaction mixture was worked up as described in Example 1. A compound having the structural formula

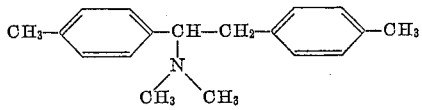

was obtained as a colorless liquid having a boiling point of 128° C. at 0.5 mm. Hg. On analysis, its nitrogen content was found to be 5.52% (calculated: 5.54%.) The yield was 67% of theory.

The colorless crystalline hydrochloride of this compound had a melting point of 209° C.

EXAMPLE 8

*1-Phenyl-1-Dimethylamino-2-(4-Methyl-Phenyl)-Ethane*

A Grignard reagent, prepared from 4.6 gm. magnesium and 37 gm. p-xylyl bromide, was reacted in ether with 16 gm. phenyl-dimethylamino-acetonitrile and the reaction mixture was worked up as described in Example 1. A compound having the structural formula

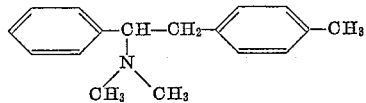

and a boiling point of 118° C. at 0.15 mm. Hg was obtained. The yield was 68% of theory.

EXAMPLE 9

*1-Phenyl-1-Dimethylamino-2-(4-Methoxy-Phenyl)-Ethane*

A Grignard reagent was prepared from 19 gm. fine magnesium shavings, 40 gm. p-methoxybenzyl-bromide and a few grains of iodine in 100 cc. anhydrous ether. An ethereal solution of 14 gm. phenyl-dimethylamino-acetonitrile was added dropwise to the Grignard solution while stirring continuously. After all of the acetonitrile solution had been added, the mixture was refluxed at the boiling point for 2½ hours. After cooling, the reaction mixture was decomposed by adding ice and dilute hydrochloric acid. The ethereal layer was separated and discarded. The aqueous solution was made alkaline with ammonia. The alkaline solution was extracted repeatedly with ether. The ether extract solutions were combined and vigorously and repeatedly shaken with about 5% hydrochloric acid. The resulting aqueous hydrochloric acid solutions were combined, made alkaline with ammonia and extracted with ether. The resulting ethereal solution was heated to evaporate the ether and yielded 8.5 gm. of a compound having the structural formula

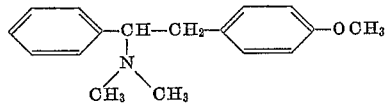

and a boiling point of 125° C. at 0.45 mm. Hg.

The melting point of its hydrochloride was 196–197° C.

EXAMPLE 10

*1-(4-Methoxy-Phenyl)-1-Dimethylamino-2-Phenyl-Ethane Benzylo-Bromide*

1 gm. 1-(4-methoxy-phenyl)-1-dimethylamino-2-phenyl-ethane, obtained according to Example 1, was dissolved in 20 gm. anhydrous acetone. 3 gm. benzyl bromide were added to the acetone solution and the mixture was refluxed at the boiling point on a water bath for 3 hours. Thereafter, most of the acetone solvent was removed from the reaction mixture by evaporation and the residue was admixed with ether. A quaternary compound precipitated out which had the structural formula

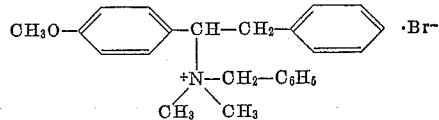

The precipitated crystalline quaternary compound was triturated with anhydrous ether and recrystallized from a mixture of ethanol and ether (1:1). The purified product was obtained in the form of colorless crystals having a melting point of 155° C.

EXAMPLE 11

*1-(4-Methoxy-Phenyl)-1-Dimethylamino-2-Phenyl-Ethane Metho-Iodide*

2 gm. (4-methoxy-phenyl)-1-dimethylamino-2-phenyl-ethane were dissolved in 10 cc. anhydrous acetone. 2 gm. methyl iodide were added to the acetone solution and the mixture was heated gently for 4 hours. Thereafter, ether was added to the reaction mixture, whereby a quaternary compound having the structural formula

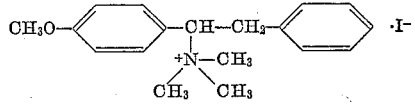

precipitated out. Its melting point was 166° C.

EXAMPLE 12

*1-(4-Methoxy-Phenyl)-1-Dimethylamino-2-Phenyl-Ethane*

(a) *4-methoxy-benzal-methylimine.*—272 gm. anisaldehyde was added dropwise to 176 gm. of a 35% aqueous methylamine solution, accompanied by stirring and cooling with ice. Stirring was continued for 2 hours at about 20° C. after all of the anisaldehyde had been added. The oily layer was separated and the aqueous layer was shaken with benzene. The benzene solution was freed from solvent by evaporation and the residue, combined with the oily layer, was subjected to distillation. 277 gm. of an oily compound having the structural formula

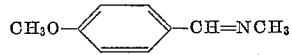

and a boiling point of 123° C. at 15 mm. Hg.

(b) *1-(4-methoxy-phenyl)-1-methylamine - 2 - phenyl-ethane.*—53 gm. technical grade benzyl chloride were added dropwise to 9.2 gm. magnesium powder suspended in 140 cc. of a mixture of benzene and tetrahydrofuran (1:1), while stirring and cooling the mixture. Thereafter, stirring was continued at about 35–40° C. for one hour. 30 gm. 4-methoxy-benzal-methylimine, dissolved in 50 cc. of a mixture of benzene and tetrahydrofuran (1:1) were then added dropwise, while stirring and cooling so that the temperature did not rise above 35° C. Thereafter, stirring was continued for 4 hours at about 30–40° C. The reaction mixture was then poured into a mixture of ice and hydrochloric acid. 150 cc. xylene were added and the mixture was shaken thoroughly. The xylene layer formed thereby was separated and extracted twice with one volume of dilute hydrochloric acid. The acid aqueous extracts were combined and were then made alkaline with ammonia. The alkaline mixture was repeatedly shaken with benzene. The benzene extracts were combined and subjected to distillation to drive off the benzene solvent. The oil residue has a boiling point of 121–122° C. at 0.1 mm. Hg and, upon standing at room temperature, solidified into a colorless crystalline mass which consisted of a compound having the structural formula

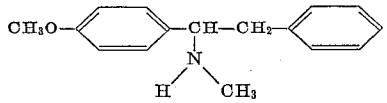

and a melting point of 47–48° C. The yield was 44 gm.

(c) *1-(4-methoxy-phenyl)-1-dimethylamino - 2-phenyl-ethane.*—90 cc. formic acid and 90 cc. 30% aqueous formaldehyde were added to 72 gm. of the secondary amine obtained according to (b) above, accompanied by cooling. Thereafter, 11 gm. paraformaldehyde were added in small portions. After all of the paraformaldehyde had been added, the mixture was heated on a boiling water bath for 2 hours and was then concentrated by evaporation in a vacuum to half its original volume. After cooling, the reaction mixture was made alkaline with a 15% aqueous sodium hydroxide solution, accompanied by cooling. The precipitate formed thereby was separated and taken up in benzene. The benzene solvent was removed by distillation and the residue was distilled in a vacuum. 68 gm. of an oily compound having the structural formula

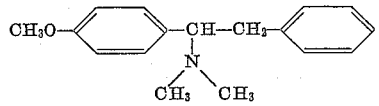

and a boiling point of 142–143° C. at 0.5 mm. Hg were obtained.

(d) *1-(4-methoxy-phenyl)-1-dimethylamino-2-phenyl-ethane.*—24 gm. 1-(4-methoxy-phenyl)-1-methylamino-2-phenyl-ethane were refluxed with 80 cc. isopropanol and 50 cc. 35% aqueous formaldehyde on a water bath for 3 hours. The isopropanol was then distilled off, the residue was taken up in ether, and the ethereal solution was shaken several times with dilute hydrochloric acid. The aqueous hydrochloric acid extracts were combined and were made alkaline with dilute sodium hydroxide, whereupon a precipitate formed which was extracted with ether. The residue remaining after driving off the ether from the extract solution was distilled. 12 gm. of a compound having the structural formula

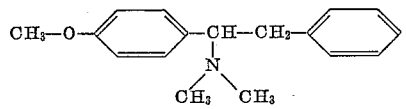

and a boiling point of 135° C. at 0.35 mm. Hg were obtained.

EXAMPLE 13

*1-(4-Methoxy-Phenyl)-1-Dimethylamino-2-Phenyl-Ethane*

10 gm. 1-(4-methoxy-phenyl)-1-amine-2-phenyl-ethane, obtained according to Neish [Rec. trav. chim. Pays-Bas, 68, 342, (1949)], were reacted with 20 cc. formic acid, 20 cc. 30% formaldehyde and 3 gm. paraformaldehyde and the reaction mixture was worked up as described in part (c) of Example 12. 8 gm. of 1-(4-methoxy-phenyl)-1-dimethylamino-2-phenyl-ethane were obtained.

EXAMPLE 14

*1-(4-Methoxy-Phenyl)-1-Dimethylamino-2-Phenylethane*

(a) *(Anisyl-dimethylamino-methyl)-butyl ether.*—A mixture of 28 gm. anisaldehyde, 12 gm. anhydrous dimethylamine, 25 gm. dry potassium carbonate and 75 gm. n-butanol was heated at 100° C. for 8 hours in a sealed tube. After cooling, the reaction mixture was filtered and the solid was separated and repeatedly washed with ether. The filtrates were combined and the ether was evaporated. The evaporation residue was distilled, leaving as a residue 31 gm. of a compound having the structural formula

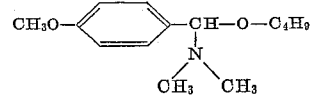

and a boiling point of 93–95° C. at 0.2 mm. Hg.

(b) *1-(4-methoxy-phenyl)-1-dimethylamino-2-phenyl-ethane.*—24 gm. (anisyl - dimethylamino-methyl)-butyl ether, dissolved in 50 cc. ether, were slowly added dropwise, while stirring, to a Grignard reagent solution produced in the usual manner from 4.8 gm. magnesium powder and 25.2 gm. benzyl chloride in ether. The reaction mixture was stirred for 5 hours at room temperature. Thereafter, the reaction mixture was poured into a mixture of ice and ammonium chloride, and, after complete decomposition, was made alkaline with dilute sodium hydroxide. The precipitate formed thereby was extracted with ether and the ether extract was distilled in a vacuum. 21 gm. of an oily compound having the structural formula

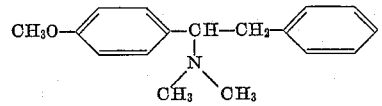

and a boiling point of 135° C. at 0.35 mm. Hg were obtained.

As previously stated and illustrated in the preceding examples, tertiary amines of the present invention are in many cases water-insoluble oils. It is, therefore, often convenient to use them pharmacologically and therapeutically as the more water-soluble acid addition salts derived from non-toxic inorganic or organic acids or in the form of quaternary ammonium salts with pharmacologically useful quaternizing radicals and ions derived from alkyl, aralkyl or cycloalkyl halogenides, dialkyl sulfates or p-toluene sulfonic acid alkyl esters.

Typical examples of pharmacologically useful non-toxic acid addition salts of the present tertiary amines are those formed with hydrochloric acid, hydrobromic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, nicotinic acid, 2-furoic acid and the like. The hydrochlorides, however, have been found to be particularly suitable for practical purposes.

Typical examples of pharmacologically useful, non-toxic quaternary ammonium salts of the present tertiary amines are those formed with methyl iodide, methyl bromide, benzyl bromide, ethyl iodide, isobutyl bromide and other alkyl chlorides, bromides or iodides, dimethyl sulfate, diethyl sulfate, p-toluene sulfonic acid alkyl esters, cyclohexyl chlorides, bromides or iodides, cyclopentyl chlorides, bromides or iodides, and the like, in accordance with customary quaternizing procedures such as those illustrated in the preceding examples.

The group of compounds embraced by Formulas I, II and III above are useful and effective pharmacological agents. More particularly, they exhibit analgesic activities which are surprisingly and unexpectedly greater than those of heretofore known amines of similar or analogous structure.

To demonstrate the unexpectedly improved analgesic properties of the tertiary amine compounds according to the present invention, certain representative members of the group of compounds defined by Formulas I, II and III were subjected to comparative tests with amines of similar structure which have been described in the prior art. The test procedure employed for this comparison was that of Reinhard de Beer (see Burn, Biological Standardization, 2nd ed., Oxford University Press, page 316), using mice as experimental animals. This test measures the pain-threshold by electrical stimulation of the tail before and after administration of a predetermined amount of the analgesic agent to be investigated.

The results of the comparative tests showed that subcutaneous injection of 20 mg./kg. 1-(4-methoxy-phenyl)-1-dimethylamino-2-phenyl-ethane hydrochloride increased the pain-threshold by 250%. Similarly, subcutaneous injection of 20 mg./kg. 1-(4-methyl-phenyl)-1-dimethylamino-2-phenyl-ethane hydrochloride or 1-(4-methoxy-phenyl)-1-dimethylamino-2-(4-methyl-phenyl)-ethane hydrochloride increased the pain-threshold by 100% and 122%, respectively.

In contrast thereto, subcutaneous injection of 20 mg./kg. of various amines of similar structure described in the prior art, namely of 1-(4-methoxy-phenyl)-1-ethyl-amino-2-phenyl-ethane hydrochloride, 1-piperidyl-1,2-diphenyl-ethane hydrochloride or 1-dimethylamino-1,2-diphenyl-ethane hydrochloride, increased the pain-threshold by only 82%, 15% and 95%, respectively.

By the same test procedure it was determined that subcutaneous administration of 20 mg./kg. 1-(4-hydroxy-phenyl)-1-dimethylamino-2-phenyl-ethane hydrochloride increased the pain-threshold by 40%, whereas subcutaneous injection of 20 mg./kg. of the corresponding secondary amine, i.e. 1-(4-hydroxy-phenyl)-1-methylamino-2-phenyl-ethane hydrochloride, described in the prior art increased the pain-threshold by only 29%.

Thus, it is evident that the tertiary amines according to the present invention are surprisingly more effective analgesics than amines of similar structure heretofore known.

An important criterion for effective therapeutic use of an analgesic agent is not only a sufficiently intense analgesic activity but also a sufficiently high water-solubility. In this respect the tertiary amines of the present invention are also vastly superior to amines of similar structure described in the prior art. For example, 50% aqueous solutions can readily be prepared with 1-(4-methoxyphenyl)-1-dimethylamino-2-phenyl-ethane hydrochloride, 1-(4-methyl-phenyl)-1-dimethylamino-2-phenyl-ethane hydrochloride or 1-(4-methoxy-phenyl)-1-dimethylamino-2-(4-methyl-phenyl)-ethane hydrochloride.

In contrast thereto, the solubility of 1-(4-methoxy-phenyl)-1-ethylamino-2-phenyl-ethane hydrochloride is only 1% by weight, that of 1-(4-methoxy-phenyl)-1-piperidyl-ethane hydrochloride less than 2.5% by weight, that of 1,2-diphenyl-1-piperidyl-ethane hydrochloride less than 5% by weight, that of 1,2-diphenyl-1-dimethylamino-ethane hydrochloride 5% by weight, and that of 1-(4-methyl-phenyl)-1-piperidyl-2-phenyl-ethane hydrochloride less than 2.5% by weight.

While we have illustrated the present invention with the aid of certain specific embodiments thereof, it will be readily apparent to those skilled in the art that the invention is not limited to these embodiments, and that various changes and modifications may be made without departing from the spirit of the invention or the scope of the appended claims.

We claim:

1. A compound selected from the group consisting of 1-(4-methoxy-phenyl) - 1 - dimethylamino - 2 - phenyl-ethane, its acid addition salts with pharmacologically useful acids, and its quaternary salts with pharmacologically useful quaternizing radicals and ions.

2. 1-(4-methoxy-phenyl) - 1 - dimethylamino-2-phenyl-ethane hydrochloride.

3. 1-(4-methoxy-phenyl) - 1 - dimethylamino-2-phenyl-ethane.

References Cited in the file of this patent
UNITED STATES PATENTS 2,506,588    Goodson et al. _____ May 9, 1950

FOREIGN PATENTS 802,724    Great Britain _____ Oct. 8, 1958

OTHER REFERENCES

Dodds et al.: "Proceedings, Royal Soc." (London), vol. 132, pages 119–123 (1945).

Goodson et al.: "Jour. Am. Chem. Soc.," vol. 72, pages 358–362 (1950).